United States Patent
Cheng et al.

(10) Patent No.: US 12,520,133 B2
(45) Date of Patent: Jan. 6, 2026

(54) THIRD PARTY CONTROL OF A USER EQUIPMENT

(71) Applicant: QUALCOMM Incorporated, San Diego, CA (US)

(72) Inventors: Hong Cheng, Basking Ridge, NJ (US); Junyi Li, Chester, NJ (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/146,384

(22) Filed: Jan. 11, 2021

(65) Prior Publication Data

US 2021/0274344 A1 Sep. 2, 2021

Related U.S. Application Data

(60) Provisional application No. 62/982,455, filed on Feb. 27, 2020.

(51) Int. Cl.
*H04W 12/037* (2021.01)
*H04W 4/40* (2018.01)
(Continued)

(52) U.S. Cl.
CPC ........... *H04W 12/037* (2021.01); *H04W 4/40* (2018.02); *H04W 12/06* (2013.01); *H04W 12/63* (2021.01);
(Continued)

(58) Field of Classification Search
CPC ..... H04W 12/037; H04W 4/40; H04W 12/06; H04W 12/63; H04W 12/71; H04W 12/61;
(Continued)

(56) References Cited

U.S. PATENT DOCUMENTS

| | | | |
|---|---|---|---|
| 10,327,265 B2 | 6/2019 | Ly et al. | |
| 2012/0022719 A1* | 1/2012 | Matos | G08G 5/0026 701/2 |

(Continued)

FOREIGN PATENT DOCUMENTS

| | | | |
|---|---|---|---|
| CN | 104778765 A | | 7/2015 |
| CN | 105471974 A | * | 4/2016 |

(Continued)

OTHER PUBLICATIONS

Chen Y-J., et al., "Privacy Protection for Internet of Drones: A Network Coding Approach", IEEE Internet of Things Journal, IEEE, USA, vol. 6, No. 2, Apr. 1, 2019 (Apr. 1, 2019), pp. 1719-1730, XP011723605, DOI: 10.1109/JIOT.2018.2875065 [retrieved on May 7, 2019] paragraphs [III.C], [00IV].

(Continued)

*Primary Examiner* — Ali S Abyaneh
*Assistant Examiner* — Lydia L Noel
(74) *Attorney, Agent, or Firm* — Procopio, Cory, Hargreaves & Savitch LLP

(57) ABSTRACT

A configuration for allowing a wireless device to request control of another wireless device. The apparatus receives a message from a first user equipment (UE), the message comprising a first identifier (ID). The apparatus sends a first request to an authority requesting authorization to control the first UE. The apparatus receives information from the authority for controlling the first UE. The apparatus transmits a second request for connection with the first UE to control the first UE, the second request comprising the information received from the authority.

30 Claims, 14 Drawing Sheets

(51) Int. Cl.
*H04W 12/06* (2021.01)
*H04W 12/63* (2021.01)
*H04W 12/71* (2021.01)

(52) U.S. Cl.
CPC ......... *H04W 12/71* (2021.01); *B64U 2201/20* (2023.01)

(58) Field of Classification Search
CPC ..... H04W 12/72; H04W 12/08; H04W 12/50; H04W 12/69; H04W 12/02; B64C 39/024; B64C 2201/146; G08G 5/0069; H04L 67/125; H04L 67/12; G05D 1/0022
See application file for complete search history.

(56) References Cited

U.S. PATENT DOCUMENTS

| 2017/0372600 | A1* | 12/2017 | Palin | H04W 4/80 |
| 2018/0007140 | A1* | 1/2018 | Brickell | H04W 12/00 |
| 2019/0051190 | A1* | 2/2019 | Russell | G05D 1/0027 |
| 2019/0166116 | A1* | 5/2019 | Kumar | H04L 9/3268 |
| 2020/0082402 | A1* | 3/2020 | Patel | G06Q 20/405 |
| 2020/0245394 | A1* | 7/2020 | Wu | H04W 76/11 |
| 2021/0206492 | A1* | 7/2021 | Faccin | H04L 67/12 |
| 2021/0329460 | A1* | 10/2021 | Liao | H04L 63/0892 |
| 2022/0022154 | A1* | 1/2022 | Hong | H04W 60/00 |
| 2022/0159696 | A1* | 5/2022 | Lu | H04W 72/543 |
| 2023/0139748 | A1* | 5/2023 | Fox | H04W 12/08 713/176 |

FOREIGN PATENT DOCUMENTS

| CN | 107078997 A | | 8/2017 | |
| CN | 109716806 A | | 5/2019 | |
| CN | 110049040 A | * | 7/2019 | .......... H04L 3/0428 |
| EP | 3195551 A1 | | 7/2017 | |
| WO | WO-2016154945 A1 | * | 10/2016 | .......... B64C 39/024 |
| WO | 2017139039 A1 | | 8/2017 | |
| WO | 2018084995 A1 | | 5/2018 | |
| WO | 2020033905 A1 | | 2/2020 | |

OTHER PUBLICATIONS

International Search Report and Written Opinion - PCT/US2021/013129 - ISA/EPO - 2021-04-29 (202364WO).

* cited by examiner

THIRD PARTY CONTROL OF A USER EQUIPMENT

CROSS REFERENCE TO RELATED APPLICATION(S)

This application claims the benefit of U.S. Provisional Application Ser. No. 62/982,455, entitled "Third Party Control of a User Equipment" and filed on Feb. 27, 2020, which is expressly incorporated by reference herein in its entirety.

BACKGROUND

Technical Field

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. The apparatus receives a message from a first user equipment (UE), the message comprising a first identifier (ID). The apparatus sends a first request to an authority requesting authorization to control the first UE. The apparatus receives information from the authority for controlling the first UE. The apparatus transmits a second request for connection with the first UE to control the first UE, the second request comprising the information received from the authority.

In another aspect of the disclosure, a method, a computer-readable medium, and an apparatus are provided for wireless communication at a UE. The apparatus broadcasts a message comprising a first ID for the UE. The apparatus receives a request from a wireless device for a connection with the UE to control the UE, the request comprising information based on the first ID and received from an authority that provided the first ID for the UE. The apparatus uses the information to verify authorization of the wireless device to control the UE. The apparatus establishes a connection with the wireless device to control the UE after verifying the authorization of the wireless device to control the UE.

In another aspect of the disclosure, a method, a computer-readable medium, and an apparatus are provided. The apparatus receives a request from a wireless device requesting authorization to control a user equipment (UE), the request comprising at least a first identifier (ID) for the UE and a second ID for the wireless device. The apparatus verifies the wireless device based on the second ID and the UE based on the first ID. The apparatus sends information to the wireless device authorizing the wireless device to control the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
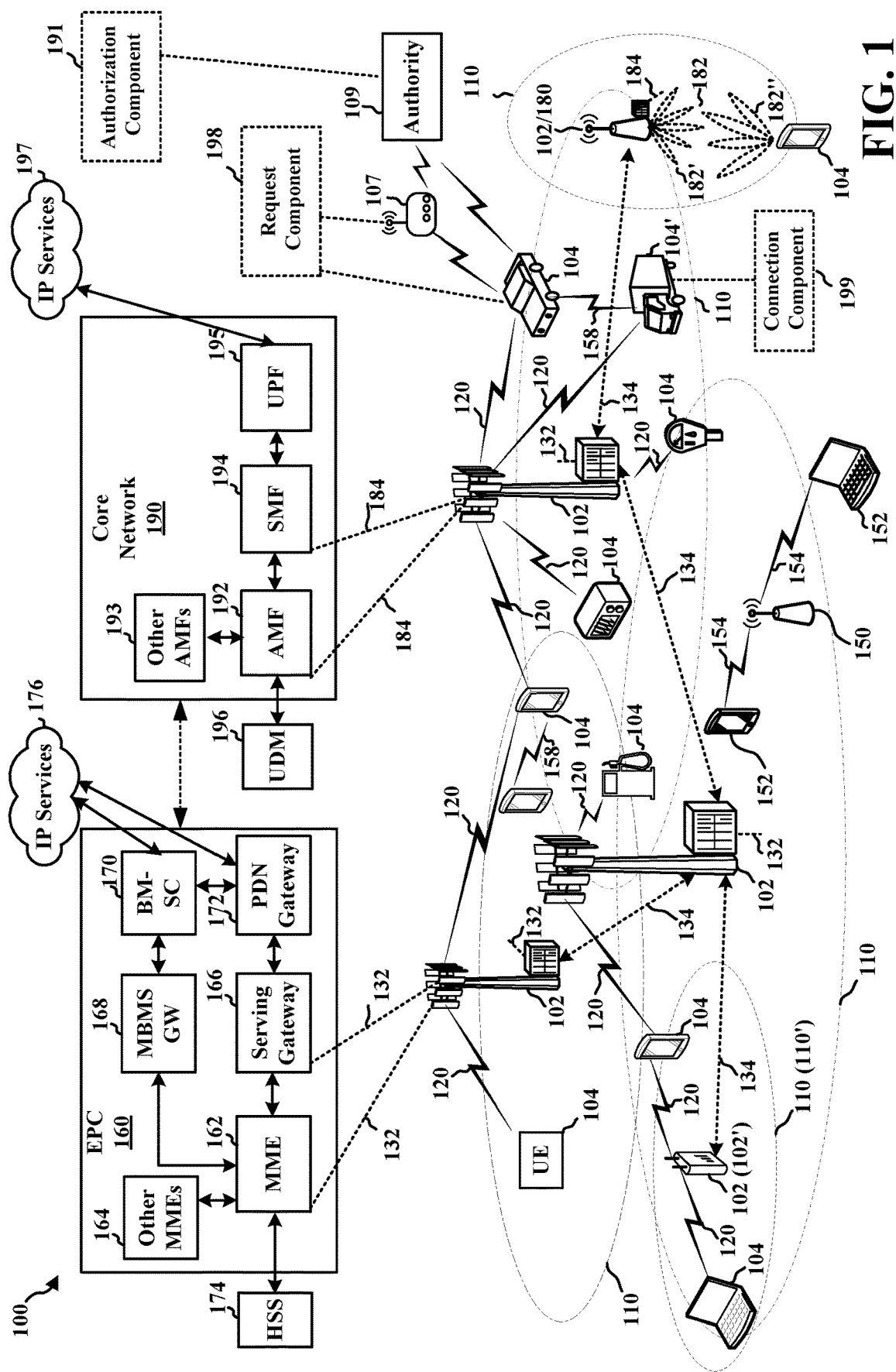
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may be configured to request control of another wireless device (e.g., a first UE). For example, UE 104, RSU 107, etc. may comprise a request component 198 configured to send a request to an authority requesting authorization to take control of another wireless device. The UE 104 may receive a message from a first UE 104', the message comprising a first ID. The UE 104 sends a first request to an authority 109 requesting authorization to control the first UE 104'. The UE 104 receives information from the authority 109 for controlling the first UE 104'. The UE 104 transmits a second request for connection with the first UE 104' to control the first UE 104', the second request comprising the information received from the authority.

Referring again to FIG. 1, in certain aspects, the UE 104' may be configured to establish a connection with a wireless device to allow the wireless device to control the UE 104. For example, UE 104' may comprise a connection component 199 configured to establish a connection with the wireless device to allow control of the UE 104'. The UE 104' may broadcast a message comprising a first ID for the UE 104'. The UE 104' may receive a request from a wireless device (e.g., UE 104, RSU 107, etc.) for a connection with the UE 104' to control the UE 104', the request comprising information based on the first ID and received from an authority that provided the first ID for the UE 104'. The UE 104' may use the information to verify authorization of the wireless device to control the UE 104'. The UE 104' may establish a connection with the wireless device to control the UE 104' after verifying the authorization of the wireless device to control the UE 104'.

Referring again to FIG. 1, in certain aspects, the authority 109 may be configured to authorize a wireless device (e.g., UE 104, RSU 107, etc.) to take control over UE 104'. For example, the authority 109 may comprise an authorization component 191 configured to send information to a wireless device (e.g., UE 104, RSU 107, etc.) authorizing the wireless device to control device UE 104'. The authority 109 may receive a request from a wireless device requesting authorization to control a UE, the request comprising at least a first ID for the UE and a second ID for the wireless device. The authority 109 may verify the wireless device based on the second ID and the UE based on the first ID. The authority 109 may send information to the wireless device authorizing the wireless device to control the UE.

Figure 2:
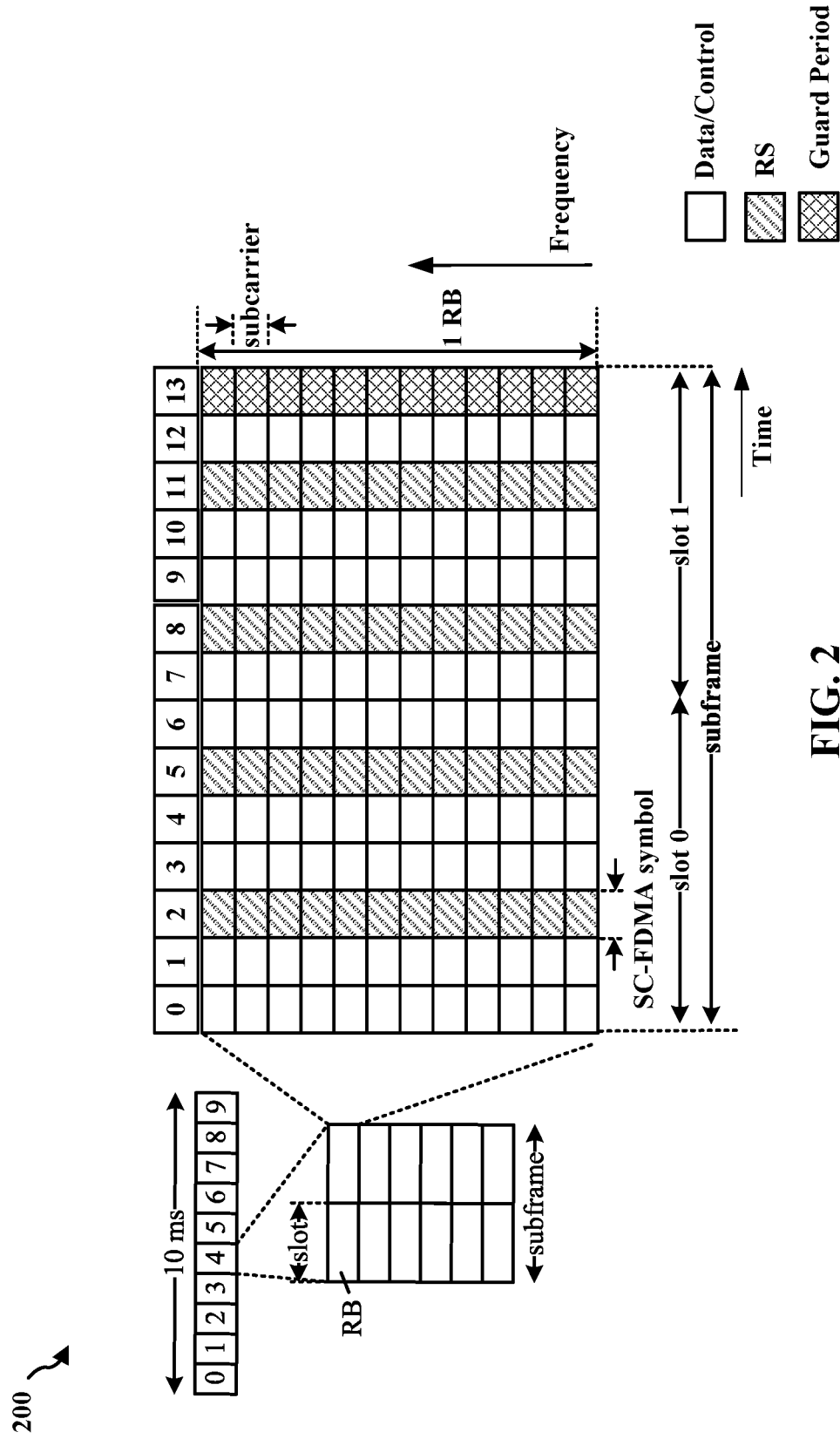
FIG. 2 illustrate example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
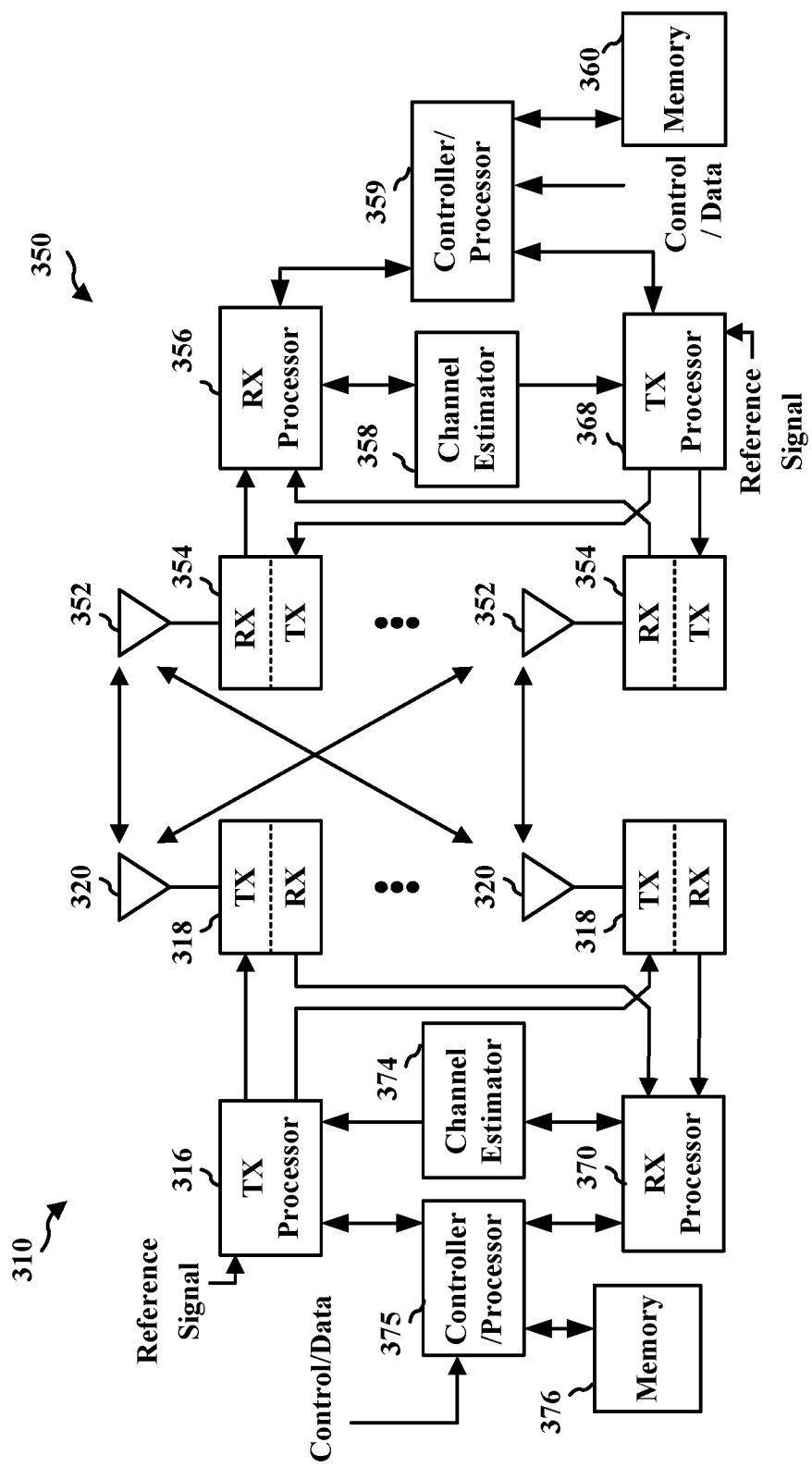
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/other D2D communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 191, 198, or 199 of FIG. 1.

Figure 4:
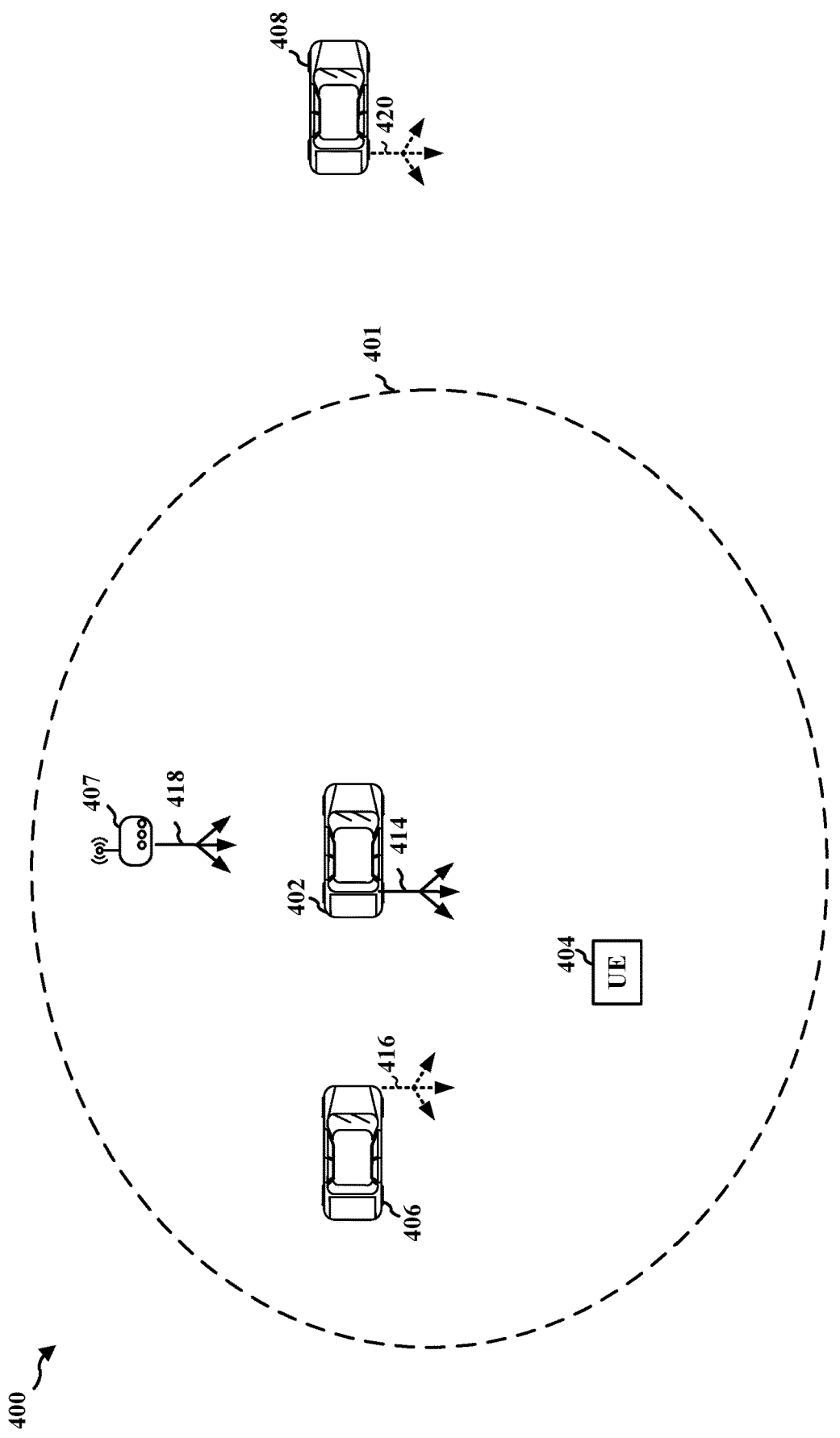
FIG. 4 is a diagram illustrating an example of a first device and a second device involved in wireless communication based, e.g., on sidelink communication.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device.

The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit 418 communication to UEs 402, 404, 406, 408.

UE 402, 404, 406, 408 or RSU 407 may comprise a request component, similar to 198 or a connection component 199 described in connection with FIG. 1.

Figure 5:
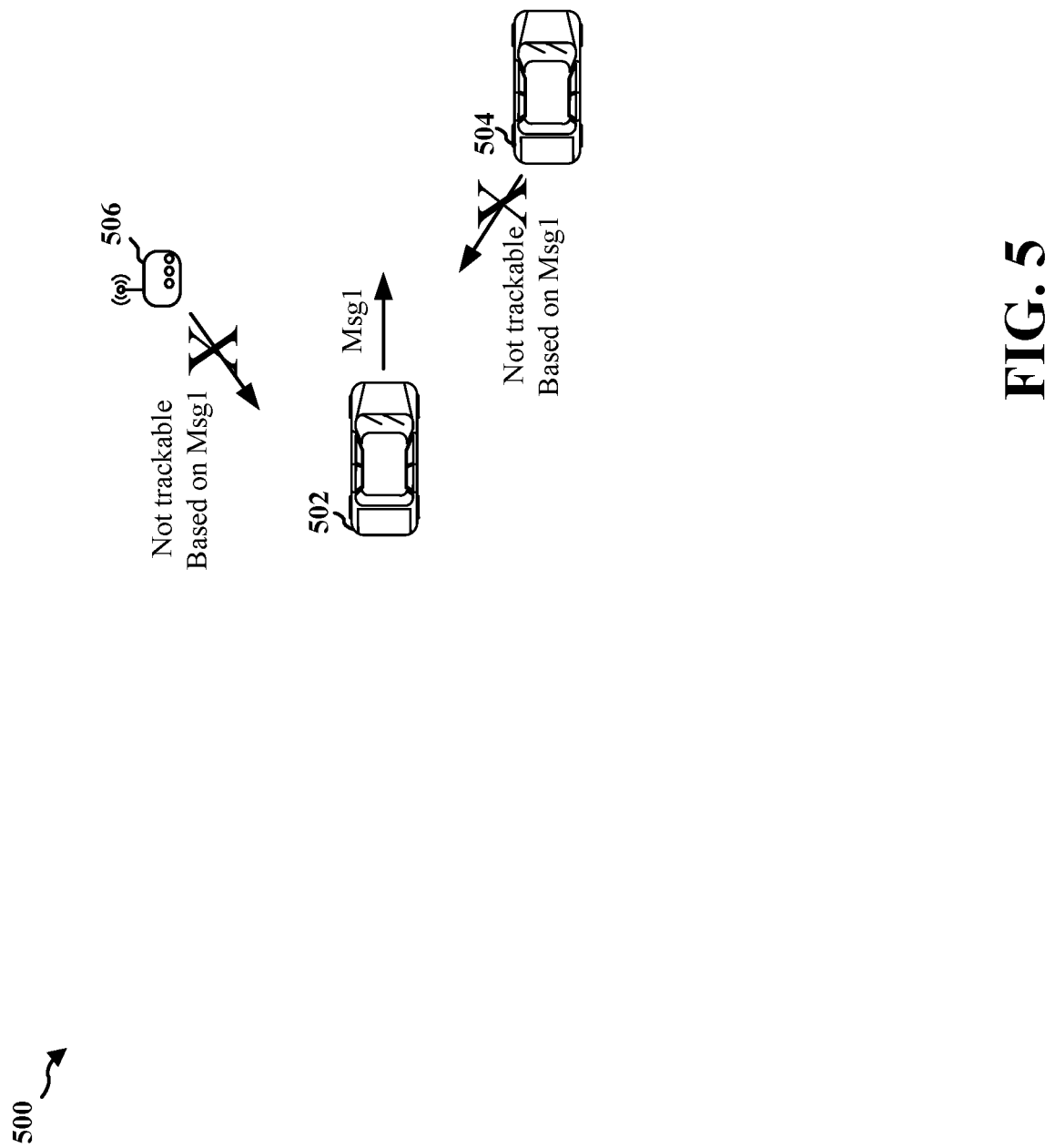
FIG. 5 is a diagram illustrating an example of device-to-device communication.

FIG. 5 illustrates an example of sidelink communication, e.g., V2X, that hides the UE/vehicle 502 identity from a third party (e.g., vehicle 504, RSU 506) receiving the communication. Such restrictions or anonymous communications may be structured to provide privacy protections, e.g., so that a receiving device (another vehicle, an RSU, a UE, etc.) cannot identify the individual UE or vehicle. However, new applications and autonomous trends may introduce instances where it is helpful for a vehicle to be identified and contacted by a third party. For example, a law enforcement may attempt to take control of an autonomous vehicle that is malfunctioning. In another example, road operators (e.g., local department of transportation or highway operators) may take control over autonomous vehicles and arrange for, or otherwise assist, autonomous vehicles to travel through a temporary work zone, toll booth, station, intersection, etc. However, at the same time, the privacy protection should be maintained, i.e. other unauthorized parties are still not able to identify the vehicle and the UE. The present disclosure is directed to providing a mechanism that enables an authorized third party to obtain the UE information and establish a connection to provide control over the UE. In some aspects, the mechanism may be based on a certificate derived information that is exchanged between the UE and the wireless device attempting to control the UE. The disclosure allows for verification at the UE of the incoming third-party connection request while preserving the privacy of the UE.

As discussed above, sidelink communication, such as V2X, may include privacy protection, such that the sidelink communication does not render the UE trackable. For example, as shown in FIG. 5, a Msg1 sent by vehicle 502 may include non-trackable temporary identifiers (IDs). For example, the ID in a V2X Basic Safety Message (BSM) message may be a 4 octet temporary ID randomly set by the device and may periodically change. In addition, the Layer 2 (L2) ID used in a C-V2X message may also be based on a locally assigned random value, and may change when a configured time period elapses. As such, a third party (e.g., communication from vehicle 504, RSU 506) does not have a way to discover the true identity of the vehicle 502 based on the received C-V2X messages.

However, without identifying the UE 502, a report of an errant autonomous vehicle cannot be provided and control request to the vehicle could not be established reliably. Aspects presented herein enable reports regarding malfunctioning vehicles and allow for an authority to assume control over the errant autonomous vehicle. Aspects presented herein allow for the reliable identification of a vehicle and enable control by an authorized third party while maintaining privacy for a UE.

Figure 6:
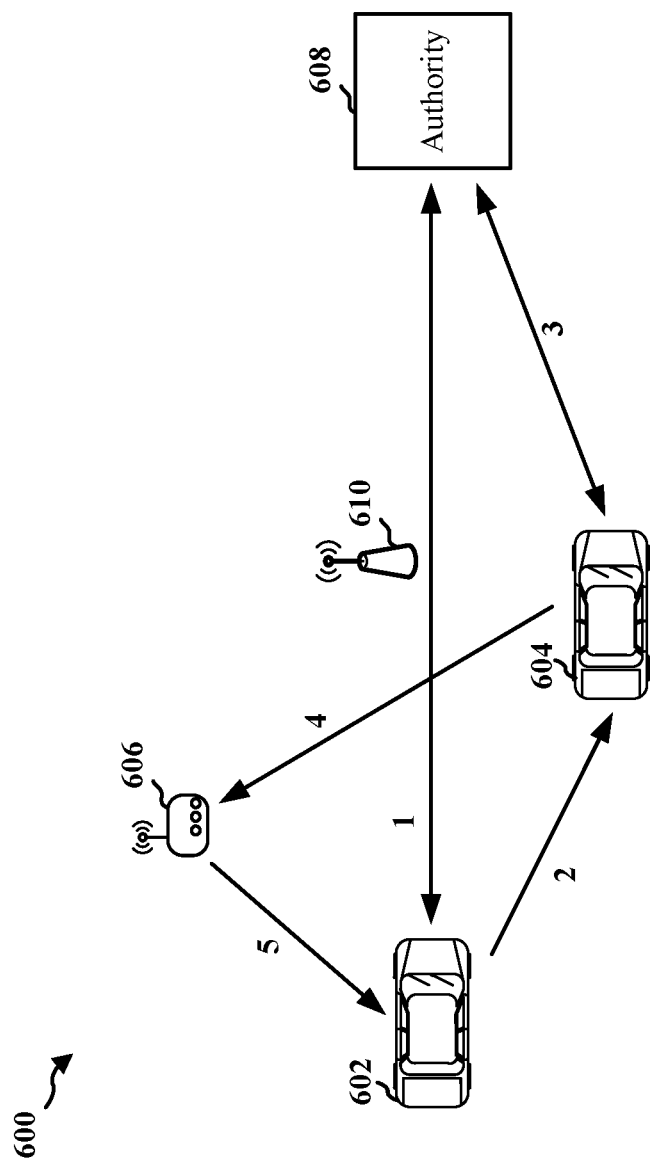
FIG. 6 is a diagram illustrating an example of a device-to-device communication.

FIG. 6 is an example system 600 illustrating a sidelink communication system in accordance with aspects of the disclosure. The system 600 includes a first UE 602, a second UE 604, an RSU 606, and an authority 608. The system 600 provides a managed sidelink communication that allows third party control of a UE while maintaining privacy. The sidelink communication may be V2X communication, for example.

In order for an autonomous vehicle (e.g., first UE 602) to be allowed on the road, the UE (included in the autonomous vehicle) may register with an authority that provisions the UE with a certificate and a pseudo ID from an authority 608 (e.g., a governmental department such as the Department of Motor Vehicles or an authority delegated by vehicle original equipment manufacturer (OEM)). In at least one aspect a pseudo ID may be an identifier allocated by the authority to the vehicle/UE. The authority may maintain a mapping of a long-term ID of the vehicle/UE, (e.g. VIN number, IMEI number, IMSI, MSISDN number, etc.), to this pseudo ID. The use of the pseudo ID ensures that no other entity than the authority is able to recover the true long-term ID of the vehicle/UE. Based on the long-term ID, the authority can have a way to assist the establishment of a communication connection to the vehicle/UE. The first UE 602 may receive the certificate and pseudo ID from the authority 608 via a wireless link 1 or may be provisioned with the certificate and pseudo ID in another manner, e.g. via a user plane connection to a provisioning server (e.g. an OMA-DM server) maintained by the authority, or through a control plane signaling to a UE provisioning system in the 5G system, e.g. the PCF that can obtain the information from the UDR or the authority server (that acts as the Application Function).

The first UE 602 may send a message 2 (e.g., a V2X message) including a certificate ID, such as described in connection with FIG. 4, besides the normal V2X contents. The certificate ID may be encrypted, e.g., based on the pseudo ID and the certificate from the authority. The certificate ID may further be encrypted based on a time at which the message is sent and/or location information for the UE when the message is sent. There can be different ways to perform the encryption, and it can be also possible to use a hash function to obfuscate the pseudo ID and the rest of the information. The encryption may help the broadcasted message 2 to be variable over time and protect the privacy of the UE.

An authorized vehicle (e.g., wireless device 604) may be configured to request the control of the first UE 602 using information received in the broadcast message 2. In some aspects, the authorized vehicle (e.g., wireless device 604) may comprise a law enforcement entity. The authorized vehicle may receive the broadcast V2X message and may use the certificate ID to determine the authority 608 in order to request the control of the first UE 602. For example, the certified ID may contain a portion that can be used as a Fully Qualified Domain Name (FQDN) for the authority, so that the authorized vehicle can query a Domain Name Service (DNS) server to obtain the IP address for the authority.

To request control of the first UE 602, the wireless device 604 may utilize the certificate ID comprised of the certified ID including the time and/or location information of the first UE 602, along with location and/or time information of the wireless device 604 when received the V2X message, the ID of the wireless device 604, and the intended control area and/or time. The wireless device 604 may transmit the request for control via link 3 between the wireless device 604 and the authority 608. The authority 608 obtains the pseudo ID of the first UE 602 using the information transmitted by the wireless device 604, for example the certified ID and the time and/or location information. The wireless device 604 can use a pre-agreed security association to protect the communication with the authority, and the authority can use the security association to verify the identity of the wireless device 604 and the request message. The authority 608 verifies and checks the authorized ID of the wireless device 604 and determines if control of the first UE 602 can be granted to the wireless device 604. If authorized, the authority 608 provides the encrypted and signed authorization ID for the first UE 602 to the wireless device 604. The encrypted and signed authorization ID of the first UE 602 may include the pseudo ID, the wireless device 604 ID, along with the allowed time and/or location information for the control. Additionally, the authorization ID may also include additional routing or address information of the first UE 602.

The wireless device 604 may attempt to establish a connection to the first UE 602 to request the control. In some instances, the connection may be direct via a PC5 link or via a Uu link. In case of using the Uu link, the wireless device 604 may use the information provided in the authorization ID to determine the address of the first UE 602. In some instances, the connection may be through a relay 4, 5 (e.g., RSU 606, another UE, or relay device) with the provided authorization information and using the ID of the wireless device 604.

The first UE 602 may verify the authorization ID to provide control of the first UE 602 to the authorized wireless device 604 by checking the information provided in the connection establishment process. The first UE 602 may allow the authorized wireless device 604 control of the first UE 602 upon verification of the authorization ID. For example, the first UE 602 may use the certificate to verify the authorization ID and retrieve the corresponding information encrypted and signed by the authority regarding the control. The first UE 602 may compare the retrieved information against that included in the message from the wireless device 604, and the actual location and time information, to determine if the authorization can be granted for the control. In some aspects, the authorization ID may be generated with a one-way-hash. In such aspects, the first UE 602 may construct the same information based on the information received in the request and its own stored information, and apply the same one-way-hash to verify if the same authorization ID value is generated for a specific location and time period. When the locally generated authorization ID matches that from the wireless device 604, then the first UE 602 would grant the access. The hash function and method to generate the authorization ID may be pre-agreed between the first UE 602 and the authority or provisioned by the authority to the first UE 602.

Figure 7:
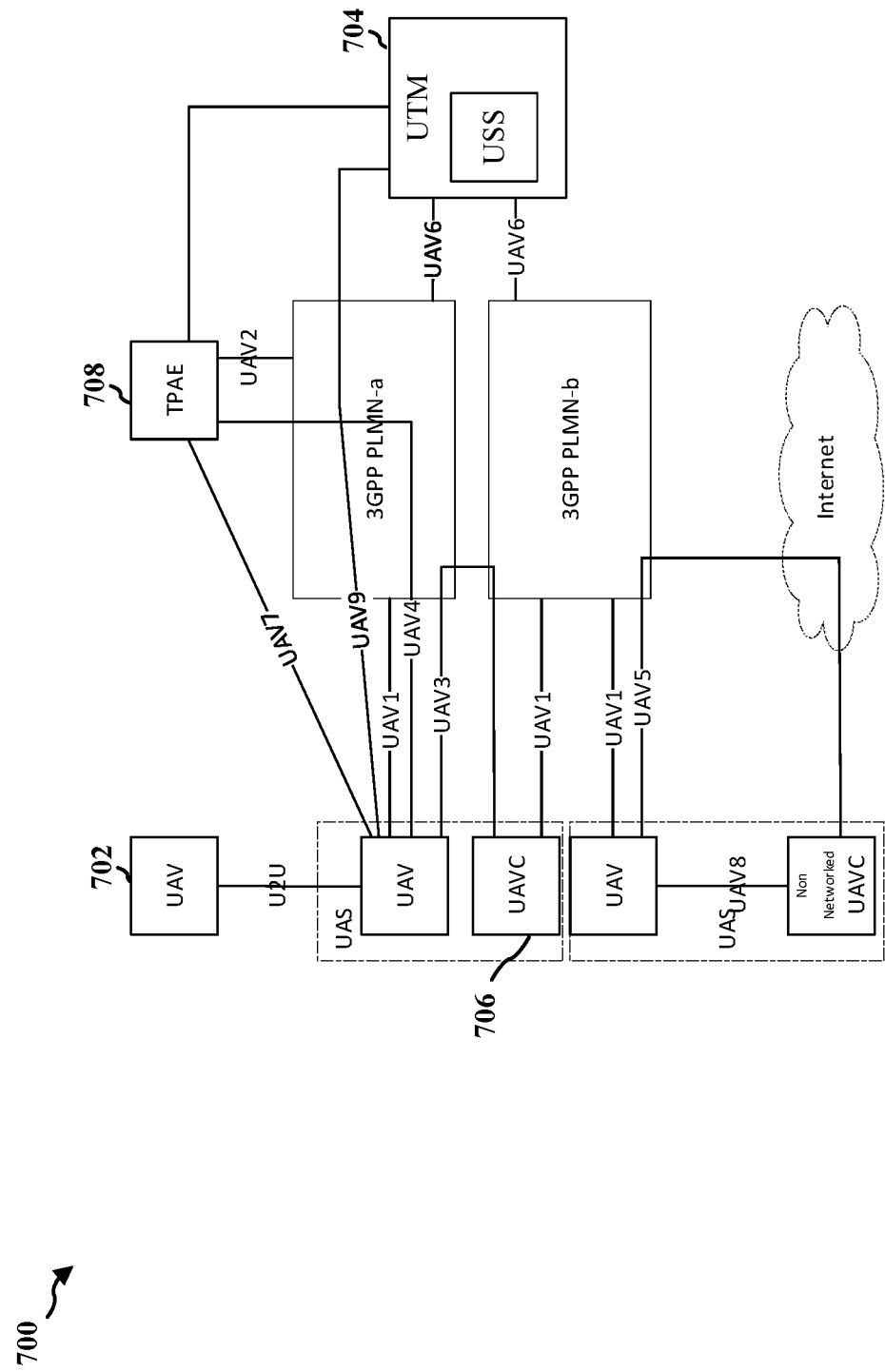
FIG. 7 is a diagram illustrating an example of a device-to-device communication.

FIG. 7 is an example system 700 illustrating a device-to-device communication system in accordance with aspects of the disclosure. The aspect of FIG. 7 is directed to instances where the first UE 702 or the UE to be controlled may be an unmanned aerial vehicle (UAV). The UTM 704 may correspond to authority 608 of FIG. 6, and may be configured to authorize control of the UAV 702 by the UAVC 706 or the TPAE 708. The UAVC 706 may correspond to the authority 608 of FIG. 6, and may be configured to provide authorization to UTM 704 to control the UAV 702. In some aspects, the TPAE 708 may also be configured to request control of the UAV 702. The TPAE 708 may be law enforcement or a ground station that may request control of the UAV 702. In some aspects, the UAVC 706 may request control of the UAV 702.

Figure 8:
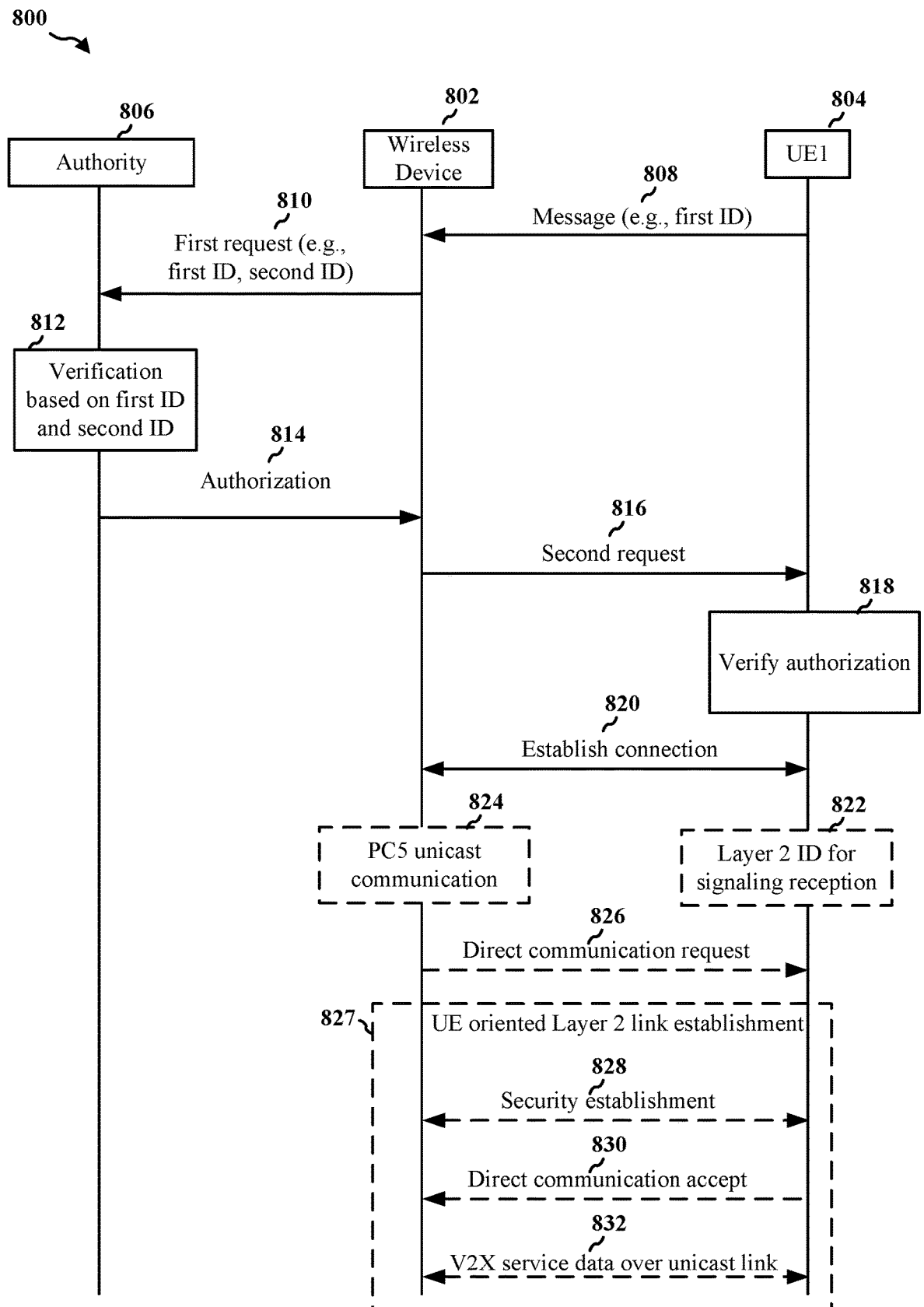
FIG. 8 is a call flow diagram of signaling between an authority, a first wireless device, and a second wireless device.

FIG. 8 is an example communication flow 800 between a wireless device 802, a UE1 804, and an authority 806. The wireless device 802 may correspond to a second UE, an RSU, a UAVC, or a TPAE, and may be configured to request and obtain authorization to control UE1 804. For example, in the context of FIG. 1, the wireless device 802 may correspond to at least UE 104; UE1 804 may correspond to UE 104'; authority 806 may correspond to authority 109. In another example, in the context of FIG. 3, the UE 804 may correspond to the device 350; and the wireless device 802 may correspond to the device 310. In other aspects, the wireless device 802 may correspond to the device 310, and the authority may correspond to device 350. Alternately, the wireless device 802 may correspond to the device 350, and the authority may correspond to device 310.

The UE1 804 may broadcast a message 808 comprising a first ID for the UE1 804. In some aspects, the first ID may comprise an encrypted ID based on a pseudo ID for the UE1 804 provided by the authority 806 and at least one of time information and location information for the UE1 804. The wireless device 802 receives the message 808 from UE1 804.

The wireless device 802 sends a first request to the authority 806 requesting authorization to control the UE1 804. The first request to the authority 806 may include a second ID for the UE2 802 and the first ID for the UE1 804. In some aspects, the first request to the authority 806 may further include one or more of a location or zone of the message received from the UE1 804, a time, a control area in which the UE2 802 requests control of the UE1 804, or a control time during which the UE2 802 requests control of the UE1 804. The authority 806 receives the request from the UE2 802. The authority 806, at 812, verifies the UE2 802 based on the second ID and the UE1 804 based on the first ID.

The authority 806 sends information 814 to the UE2 802 authorizing the UE2 802 to control the UE1 804. The information 814 sent to the UE2 802 authorizing control of UE1 804 may comprise an encrypted and signed ID. The encrypted and signed ID may be based on one or more of a pseudo ID from the authority 806 for the UE1 804, the second ID for the UE2 802, an allowed location in which control of the UE1 804 by the UE2 802 is authorized, or an allowed time during which control of the UE1 804 by the UE2 802 is authorized. The UE2 802 receives the information 814 from the authority 806 for controlling the UE1 804.

The UE2 802 transmits a second request 816 for connection with the UE1 804 to control the UE1 804. The second request 816 may comprise the information 814 received from the authority 806. In some aspects, the second request 816 may be transmitted using at least one of a Uu connection between the UE1 804 and the UE2 802, a PC5 connection between the UE1 804 and the UE2 802, or a relay between the UE1 804 and the UE2 802. The second request 816 may further comprise a second ID for the UE2 802. In some aspects, the second request 816 may comprise a one way hash based on one or more of a pseudo ID from the authority 806 for the UE1 804, a second ID for the UE2 802, an allowed location in which control for the UE1 804 by the UE2 802 is authorized, or an allowed time during which control of the UE1 804 by the UE2 802 is authorized. In some aspects, the UE1 804 may be associated with a vehicle or an unmanned aerial vehicle (UAV).

The UE1 804, at 818, may use the information 814 to verify authorization of the UE2 802 to control the UE1 804. The UE1 804 may establish a connection 820 with the UE2 802 to control the UE1 804 after verifying the authorization 814 of the UE2 802 to control the UE1 804. In some aspects, the UE2 802 may control the UE1 804 using the connection established between the UE1 804 and the UE2 802. In some aspects, the UE2 802 may control the UE1 804 using a unicast link established with the UE1 804. In some aspects, the UE2 802 and/or the UE1 804 may establish security for the unicast link based on the information 814 received from the authority 806.

In some aspects, for example when the UE2 802 attempts to control UE1 804 via a PC5 link, the UE2 802 may obtain an application layer ID for the UE1 804 in order to establish the link. The UE2 802 may obtain the application layer ID from the authority 806, and may be based on the authorization 814. At 822, the UE1 804 determines the destination layer 2 ID for signaling reception. At 824, the V2X application layer, of the UE2 802, provides the application information for PC5 unicast communication. At 826, the UE2 802 transmits the direct communication request. The direct communication request may be broadcast or unicast.

In some aspects, for example, at 827, a UE oriented layer 2 link may be established between the UE2 802 and UE1 804. For example, at 828, UE2 802 and UE1 804 may engage in a security establishment procedure, which may be based at least on the authorization 814 that the UE2 802 received. The source user information sent from UE2 802 may include the authorized UE2 ID, so that the UE1 804 can verify the UE2 802 as an authorized UE. At 830, the UE1 804 may transmit an acceptance of the direct communication request (e.g., unicast), upon the successful completion of the security establishment. At 832, the UE2 802 and UE1 804 may engage in V2X service data communication over the unicast link.

Figure 9:
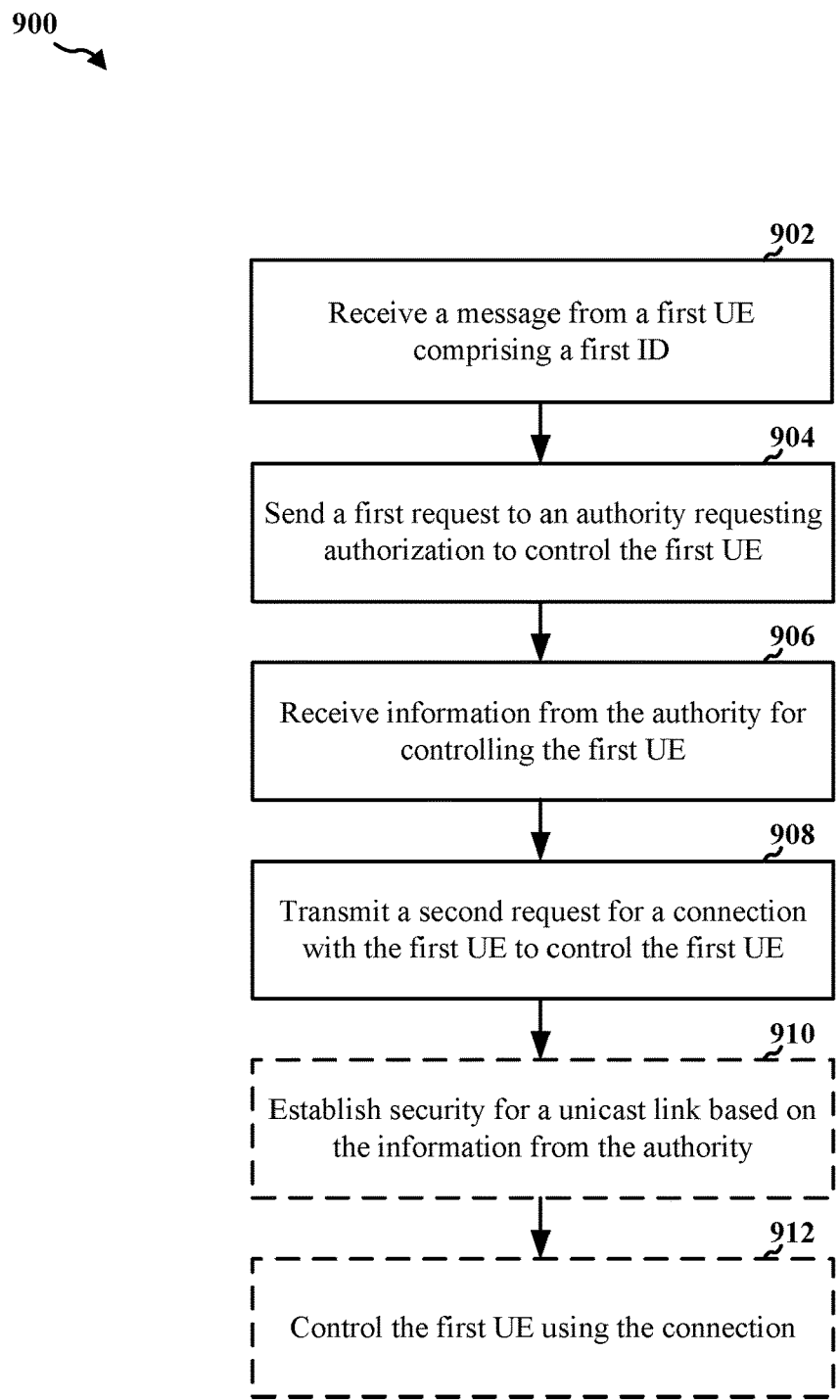
FIG. 9 is a flowchart of a method of wireless communication.

FIG. 9 is a flowchart 900 of a method of wireless communication. The method is performed by a wireless device or a component of a wireless device (e.g., device 310, a processing system, which may include the memory 376 and which may be the entire device or a component of the device, such as the TX processor 316, the RX processor 370, and/or the controller/processor 375). Among other examples, the wireless device may comprise a second UE, a RSU, a UAVC, or a TPAE. For example, the wireless device may be associated with law enforcement or safety providers that may request control of an autonomous driving vehicle that is malfunctioning or operating unsafely. The wireless device may be associated with road operators that may temporarily request control of vehicles as they pass through temporary work zones, toll booths, intersections, etc. The method may allow a wireless device to request control of another wireless device.

At 902, the wireless device receives a message from a first UE. For example, 902 may be performed by message component 1040 of apparatus 1002. The message may comprise a first ID. In some aspects, the first UE may be associated with a vehicle, such as an autonomous vehicle. In some aspects, the first UE may be associated with a UAV. The first message may be a broadcast message from the first UE, such as a BSM, a V2V message, a V2I message, a C-V2X message, or other suitable message for the UAV use. The first ID may comprise an encrypted ID based on a pseudo ID from the authority for the first UE. The first ID may be further based on at least one of time information (e.g., a time of the message) or location information (e.g., a location or zone of the first UE). For example, the first UE may be registered with the authority and may be provisioned with a certificate and a pseudo ID from the authority. In some aspects, the first ID may be referred to as a certificate ID.

At 904, the wireless device sends a first request to an authority. For example, 904 may be performed by request component 1042 of apparatus 1002. The wireless device may send the first request to the authority requesting authorization to control the first UE. In some aspects, the first request to the authority requesting authorization to control the first UE may comprise commands for information from the first UE. In some aspects, the commands for information from the first UE may comprise flight path, cargo, or the like. In some aspects, the first request to control the first UE may comprise providing instruction for maneuvering the first UE. The authority may comprise at least one of an authority for autonomous vehicles, UAVC, a TPAE, or a UTM. The first request to the authority may include the first ID for the first UE. The first request may also include a second ID for the wireless device, e.g., an authorization ID. In some aspects, the first request may include a third ID for control of the UE. For example, in addition to its own ID, the wireless device may also include an ID that is of an intended third party entity in the request to the authority. The first request to the authority may further include one or more of a location or zone of the message received from the first UE, a time, a control area in which the wireless device requests control of the first UE, or a control time during which the wireless device requests control of the first UE. The wireless device may use the first ID from the first UE to identify the authority to which the request is sent.

At 906, the wireless device receives information from the authority for controlling the first UE. For example, 906 may be performed by control component 1044 of apparatus 1002. The authority may use the information in the request to identify the first UE and to check or verify the authorization of the wireless device to control the first UE. The wireless device may then receive the information that enables the wireless device to establish a connection with the first UE for controlling the first UE. The information received from the authority for controlling the first UE may include an encrypted and signed ID based on one or more of a pseudo ID from the authority for the first UE, a second ID for the wireless device, a third ID for control of the UE by the wireless device, an allowed location in which control of the first UE by the wireless device is authorized, or an allowed time during which control of the first UE by the wireless device is authorized.

At 908, the wireless device transmits a second request for connection with the first UE to control the first UE. For example, 908 may be performed by request component 1042 of apparatus 1002. The second request may comprise the information received from the authority. The second request may be transmitted using at least one of a Uu connection between the first UE and the wireless device, a PC5 connection between the first UE and the wireless device, or a relay between the first UE and the wireless device. The second request may further include at least one of a second ID for the wireless device or a third ID for control of the UE by the wireless device. In some examples, the information may be one-way hashed so that the wireless device does not have information about the first UE's path or travel plan. The second request may include, for example, a one way hash based on one or more of a pseudo ID from the authority for the first UE, a second ID for the wireless device, an allowed location in which control of the first UE by the wireless device is authorized, or an allowed time during which control of the first UE by the wireless device is authorized.

As a part of establishing the link for controlling the first UE, the wireless device may, at 910, establish security for the unicast link based on the information received from the authority. For example, 910 may be performed by link component 1046 of apparatus 1002. For example, if a PC5 connection is used for the control, the wireless device may obtain an application layer ID for the link establishment, which may be established using the information received from the authority. For example, the wireless device may provide an authorized ID that the first UE verifies before accepting direct communication from the wireless device and establishing the unicast link with the wireless device.

In some aspects, for example at 912, the wireless device may control the first UE. For example, 912 may be performed by control component 1044 of apparatus 1002. The wireless device may control the first UE using the connection established between the first UE and the wireless device. As an example, the wireless device may control the first UE using a unicast link established with the first UE.

Figure 10:
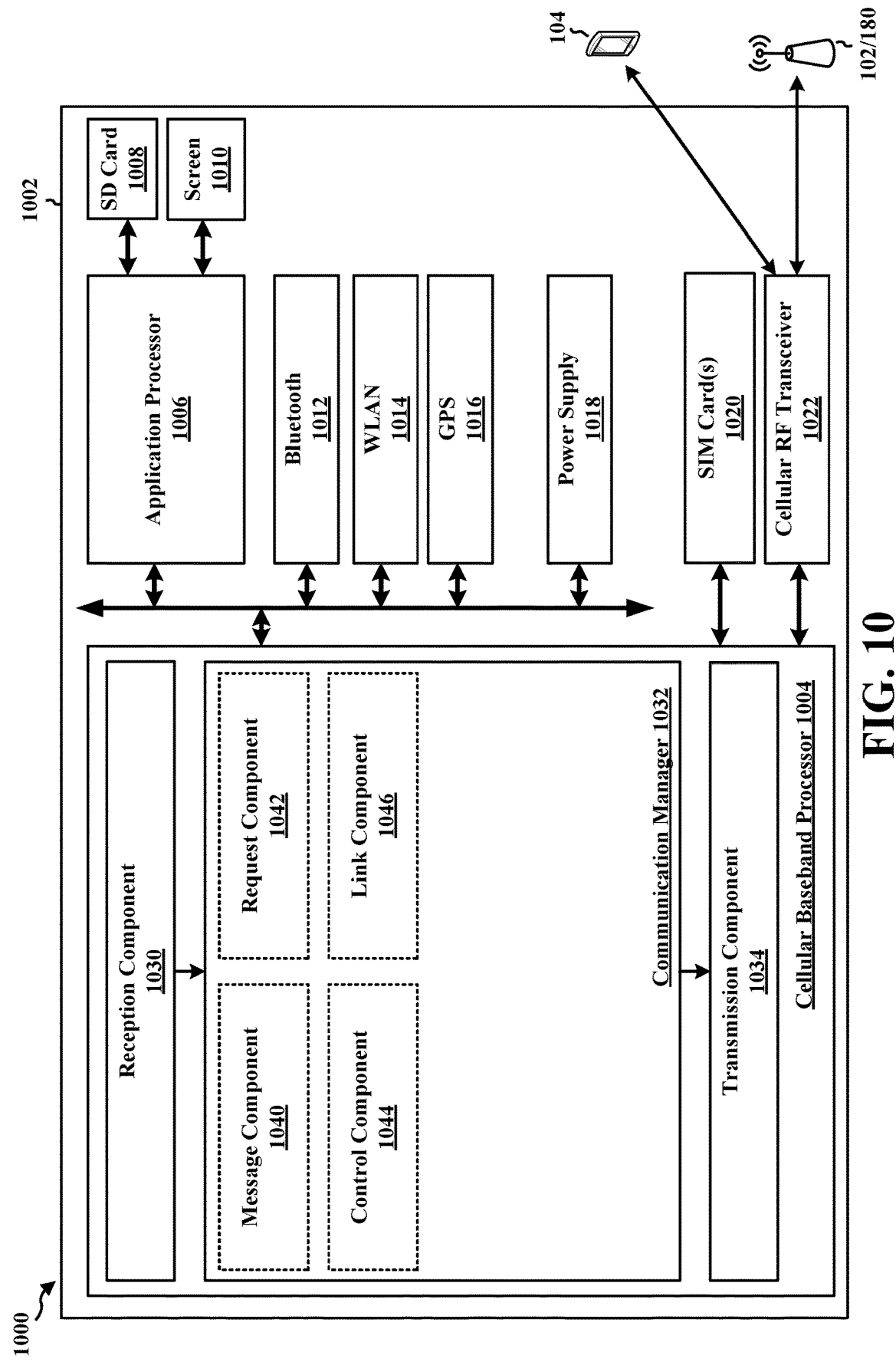
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the aforediscussed additional modules of the apparatus 1002.

The communication manager 1032 includes a message component 1040 that is configured to receive a message from a first UE, e.g., as described in connection with 902 of FIG. 9. The communication manager 1032 further includes a request component 1042 that is configured to send a first request to an authority, e.g., as described in connection with 904 of FIG. 9. The request component 1042 may be configured to transmit a second request for connection with the first UE to control the first UE, e.g., as described in connection with 908 of FIG. 9. The communication manager 1032 further includes a control component 1044 that is configured to receive information from the authority for controlling the first UE, e.g., as described in connection with 906 of FIG. 9. The control component 1044 may be configured to control the first UE, e.g., as described in connection with 912 of FIG. 9. The communication manager 1032 further includes a link component 1046 that is configured to establish security for the unicast link based on the information received from the authority, e.g., as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving a message from a first UE, the message comprising a first ID. The apparatus includes means for sending a first request to an authority requesting authorization to control the first UE. The apparatus includes means for receiving information from the authority for controlling the first UE. The apparatus includes means for transmitting a second request for connection with the first UE to control the first UE, the second request comprising the information received from the authority. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
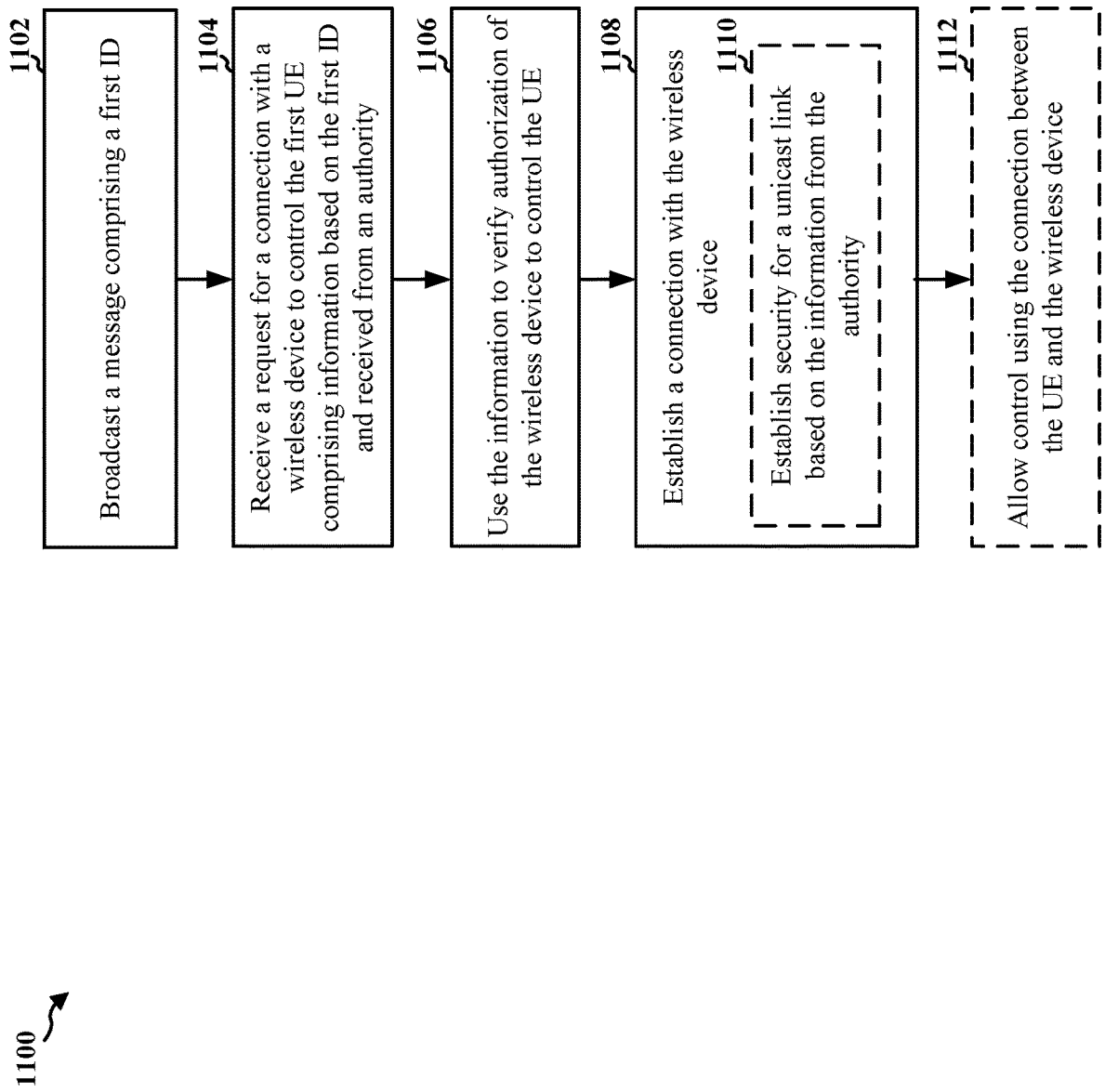
FIG. 11 is a flowchart of a method of wireless communication.

FIG. 11 is a flowchart 1100 of a method of wireless communication. The method may be performed by a UE or a component of a UE (e.g., the UE 104'; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted transposed, or contemporaneous. Optional aspects are illustrated with a dashed line. The method may allow the UE to establish a connection with a wireless device to allow the wireless device to control the UE.

At 1102, the UE broadcasts a message comprising a first ID for the UE. For example, 1102 may be performed by message component 1240 of apparatus 1202. The first UE may be associated with a vehicle, such as an autonomous vehicle. The first UE may be associated with a UAV. The first message may be a broadcast message from the first UE, such as a BSM, a V2V message, a V2I message, a C-V2X message, or other V2X message. The first ID may comprise an encrypted ID based on a pseudo ID from an authority for the first UE. The first ID may be further based on at least one of time information (e.g., a time of the message) or location information (e.g., a location or zone of the first UE). For example, the first UE may be registered with the authority and may be provisioned with a certificate and a pseudo ID from the authority. In some examples, the first ID may be referred to as a certificate ID. The authority may comprise at least one of an authority for autonomous vehicles, UAVC, a TPAE, or a UTM.

At 1104, the UE receives a request from a wireless device for a connection with the UE to control the UE. For example, 1104 may be performed by request component 1242 of apparatus 1202. In some aspects, the request from a wireless device for the connection with the UE to control the UE may comprise commands for information from the UE. In some aspects, the commands for information from the UE may comprise flight path, cargo, or the like. In some aspects, the request to control the UE may comprise providing instruction for maneuvering the UE. The request may comprise information based on the first ID and may be received from an authority that provided the first ID for the UE. In some aspects, the wireless device may comprise a second UE, an RSU, a UAVC, or a TPAE. The information received in the request may include an encrypted and signed ID based on one or more of a pseudo ID from the authority for the first UE, a second ID for the wireless device, a third ID for control of the UE by the wireless device, an allowed location in which control of the first UE by the wireless device is authorized, or an allowed time during which control of the first UE by the wireless device is authorized. The request may be received using at least one of a Uu connection between the UE and the wireless device, a PC5 connection between the UE and the wireless device, or a relay between the UE and the wireless device. In some examples, the information may be one way hashed so that the UE will only grant access when the UE is in an authorized location and/or time period. For example, the request may comprise a one way hash based on one or more of a pseudo ID from the authority for the UE, a second ID for the wireless device, an allowed location in which control of the UE by the wireless device is authorized, or an allowed time during which control of the UE by the wireless device is authorized.

At 1106, the UE uses the information to verify authorization of the wireless device to control the UE. For example, 1106 may be performed by verification component 1244 of apparatus 1202. The UE may check the information to verify that the wireless device is authorized to control the UE. The UE may further check that the wireless device is authorized to control the UE in its current location and/or at the current time. For example, the UE may check the request from the wireless device for a certificate provided to the UE by the authority.

At 1108, the UE establishes a connection with the wireless device to control the UE after verifying the authorization of the wireless device to control the UE. For example, 1108 may be performed by connection component 1246 of apparatus 1202. As part of establishing the connection, in some aspects for example at 1110, the UE may establish security for the unicast link based on the information from the authority comprised in the request. For example, 1110 may be performed by connection component 1246 of apparatus 1202. For example, if a PC5 connection is used for the control, the wireless device may obtain an application layer ID for the link establishment, which may be established using the information received from the authority. For example, the UE may receive an authorized ID from the wireless device that the first UE verifies before accepting direct communication from the wireless device and establishing the unicast link with the wireless device.

In some aspects, for example at 1112, the UE may allow control by the wireless device using the connection established between the UE and the wireless device. For example, 1112 may be performed by control component 1248 of apparatus 1202. The UE may receive the control over a unicast link established with the UE.

Figure 12:
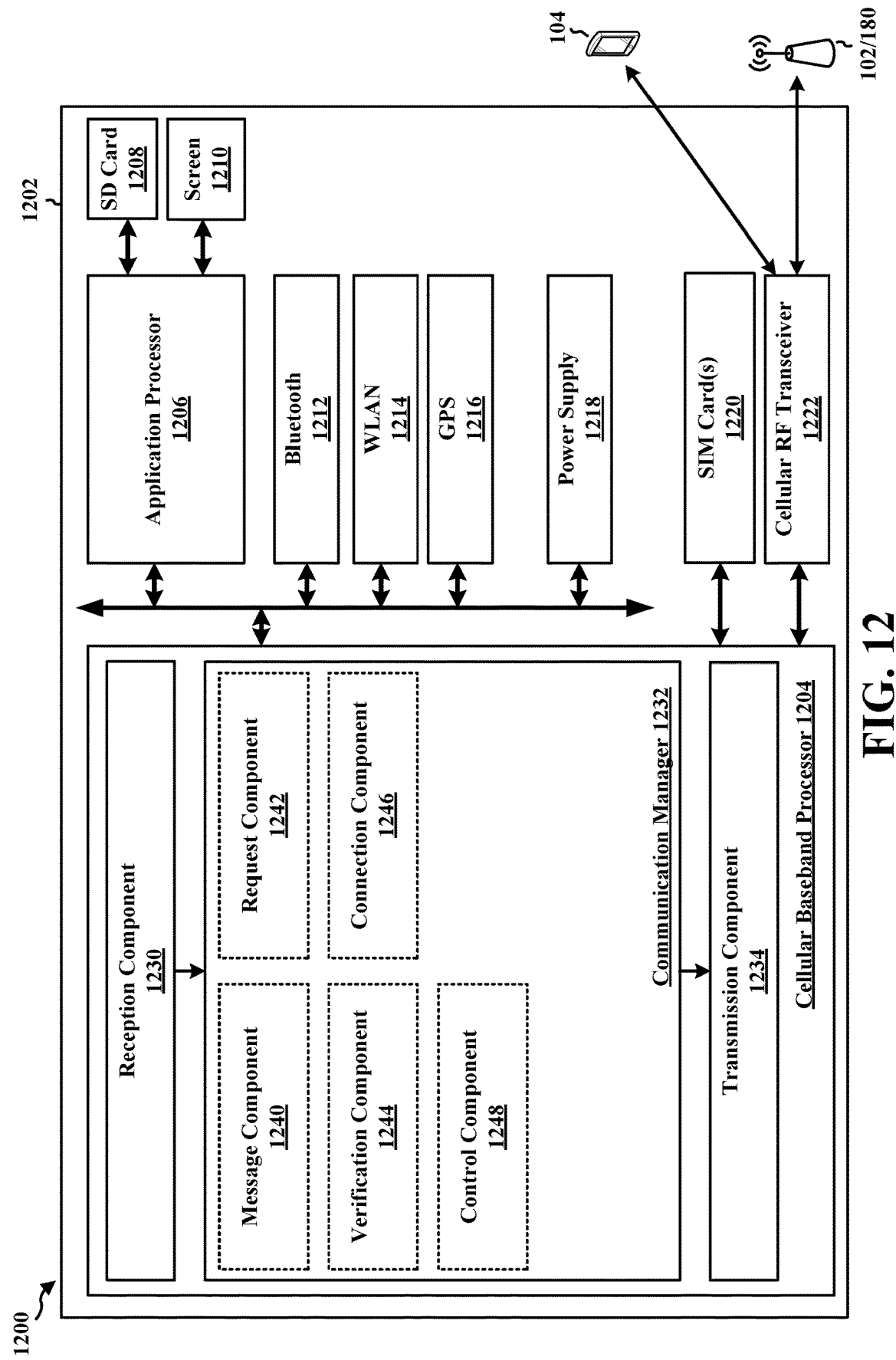
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see 350 of FIG. 3) and include the aforediscussed additional modules of the apparatus 1202.

The communication manager 1232 includes a message component 1240 that is configured to broadcast a message comprising a first ID for the UE, e.g., as described in connection with 1102 of FIG. 11. The communication manager 1232 further includes a request component 1242 that is configured to receive a request from a wireless device for a connection with the UE to control the UE, e.g., as described in connection with 1104 of FIG. 11. The communication manager 1232 further includes a verification component 1244 that is configured to use the information to verify authorization of the wireless device to control the UE, e.g., as described in connection with 1106 of FIG. 11. The communication manager 1232 further includes a connection component 1246 that is configured to establish a connection with the wireless device to control the UE after verifying the authorization of the wireless device to control the UE, e.g., as described in connection with 1108 of FIG. 11. The connection component 1246 may be configured to establish security for the unicast link based on the information from the authority comprised in the request, e.g., as described in connection with 1108 of FIG. 11. The communication manager 1232 further includes a control component 1248 that is configured to allow control by the wireless device using the connection established between the UE and the wireless device, e.g., as described in connection with 1112 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for broadcasting a message comprising a first ID for the UE. The apparatus includes means for receiving a request from a wireless device for a connection with the UE to control the UE. The request comprising information based on the first ID and received from an authority that provided the first ID for the UE. The apparatus includes means for using the information to verify authorization of the wireless device to control the UE. The apparatus includes means for establishing a connection with the wireless device to control the UE after verifying the authorization of the wireless device to control the UE. The apparatus further includes means for allowing control by the wireless device using the connection established between the UE and the wireless device. The apparatus further includes means for establishing security for the unicast link based on the information from the authority comprised in the request. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
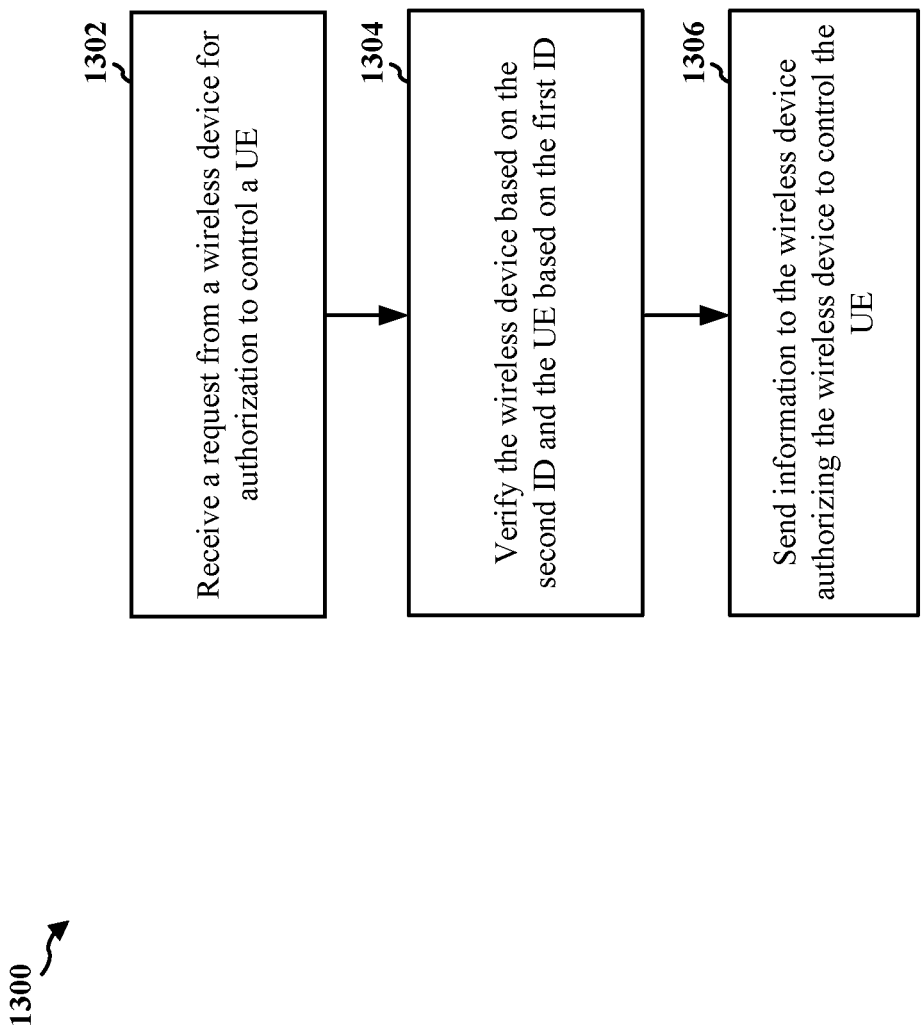
FIG. 13 is a flowchart of a method of wireless communication.

FIG. 13 is a flowchart 1300 of a method of wireless communication at an authority for authorizing control of a UE by a wireless device. The method is performed by a wireless device of an authority or a base station or a component of a base station (e.g., the authority 109 or the base station 180; the baseband unit 1404, which may include the memory 376 and which may be the entire authority 109 or base station 180 or a component of the authority 109 or base station 180, such as the TX processor 316, the RX processor 370, and/or the controller/processor 375). For example, the UE may be registered with the authority and may be provisioned with a certificate and a pseudo ID from the authority. In some examples, the first ID may be referred to as a Cert ID. Among other examples, the authority may comprise at least one of an authority for autonomous vehicles, UAVC, a TPAE, or a UTM. One or more of the illustrated operations may be omitted, transposed, or contemporaneous. Optional aspects are illustrated with a dashed line. The method may allow an authority to authorize a wireless device to take control over a UE.

At 1302, the authority receives a request from a wireless device requesting authorization to control a UE. For example, 1302 may be performed by request component 1440 of apparatus 1402. The request may comprise at least a first ID for the UE, a second ID for the wireless device, or a third ID for control of the UE. The UE may be associated with a vehicle or a UAV. Among other examples, the wireless device may comprise a second UE, a RSU, a UAVC, or a TPAE. For example, the wireless device may be associated with law enforcement or safety providers that may request control of an autonomous driving vehicle that is malfunctioning or operating unsafely. The wireless device may be associated with road operators that may temporarily request control of vehicles as they pass through temporary work zones, toll booths, intersections, etc. The request from the wireless device may further comprise one or more of a location or zone of the message received from the UE, a time, a control area in which the wireless device requests control of the UE, or a control time during which the wireless device requests control of the UE.

At 1304, the authority verifies the wireless device based on the second ID and the UE based on the first ID. For example, 1304 may be performed by verification component 1442 of apparatus 1402. The first ID may comprise an encrypted ID based on a pseudo ID from the authority for the UE and at least one of time information and location information for the UE. Thus, the authority may check to verify the ID of the wireless device requesting control and check to see whether control can be granted for the UE.

At 1306, the authority sends information to the wireless device authorizing the wireless device to control the UE. For example, 1306 may be performed by control component 1444 of apparatus 1402. The information sent to the wireless device authorizing control of the UE may comprise an encrypted and signed ID based on one or more of a pseudo ID from the authority for the UE, the second ID for the wireless device, the third ID for control of the UE, an allowed location in which control of the UE by the wireless device is authorized, or an allowed time during which control of the UE by the wireless device is authorized.

Figure 14:
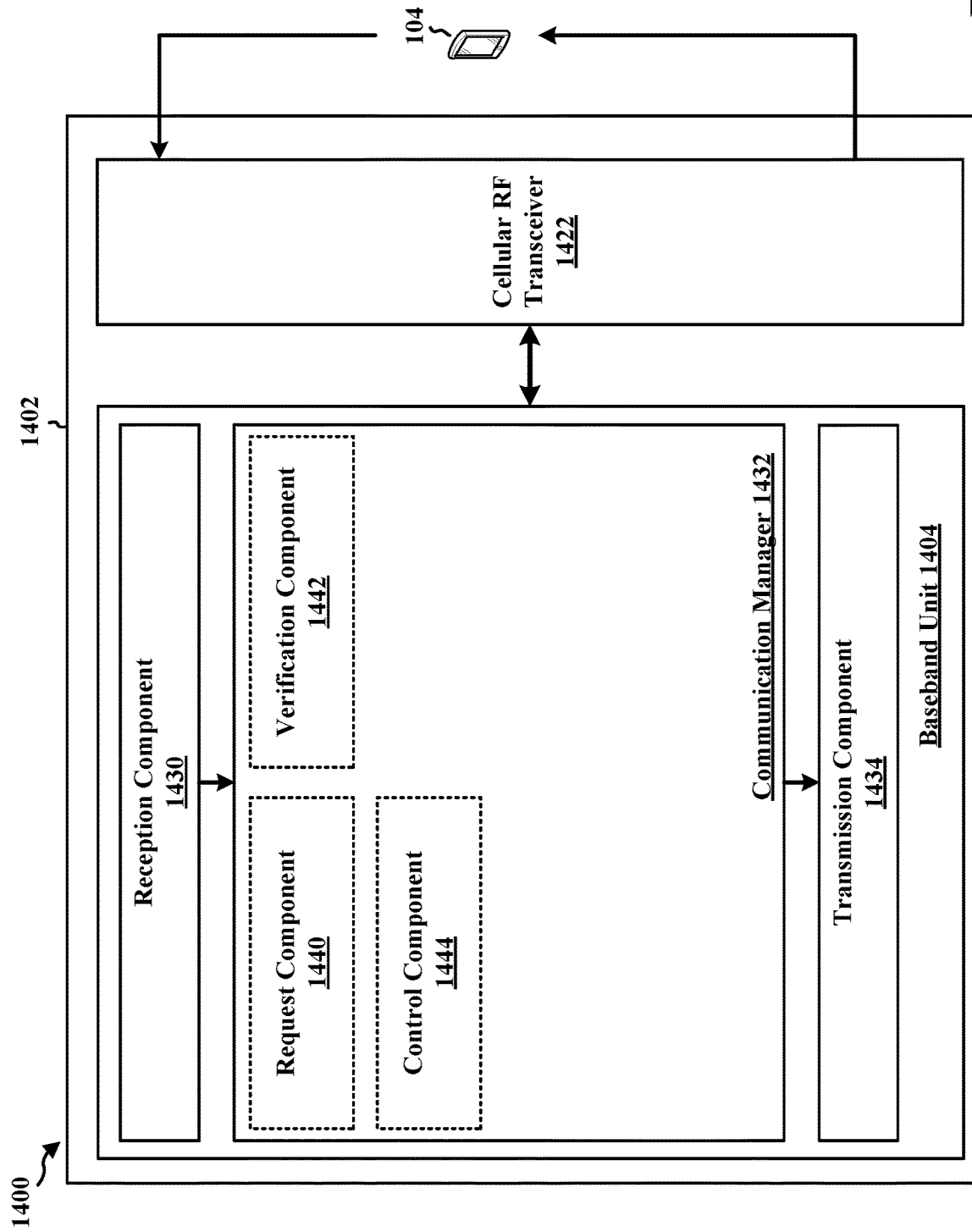
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a request component 1440 that receives a request from a wireless device requesting authorization to control a UE, e.g., as described in connection with 1302 of FIG. 13. The communication manager 1432 further includes a verification component 1442 that verifies the wireless device based on the second ID and the UE based on the first ID, e.g., as described in connection with 1304 of FIG. 13. The communication manager 1432 further includes a control component 1444 that sends information to the wireless device authorizing the wireless device to control the UE, e.g., as described in connection with 1306 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving a request from a wireless device requesting authorization to control a UE. The request comprising at least a first ID for the UE, a second ID for the wireless device, or a third ID for control of the UE. The apparatus includes means for verifying the wireless device based on the second ID and the UE based on the first ID. The apparatus includes means for sending information to the wireless device authorizing the wireless device to control the UE. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a wireless device comprising receiving a message from a first UE, the message comprising a first ID; sending a first request to an authority requesting authorization to control the first UE; receiving information from the authority for controlling the first UE; and transmitting a second request for connection with the first UE to control the first UE, the second request comprising the information received from the authority.

In Aspect 2, the method of Aspect 1 further includes that the first ID comprises an encrypted ID based on a pseudo ID from the authority for the first UE and at least one of time information or location information.

In Aspect 3, the method of Aspect 1 or 2 further includes that the first request to the authority includes the first ID for the first UE and at least one of a second ID for the wireless device or a third ID for control of the UE.

In Aspect 4, the method of any of Aspects 1-3 further includes that the first request to the authority further comprises one or more of a location or zone of the message received from the first UE, a time, a control area in which the wireless device requests control of the first UE, or a control time during which the wireless device requests control of the first UE.

In Aspect 5, the method of any of Aspects 1-4 further includes that the information received from the authority for controlling the first UE comprises an encrypted and signed ID based on one or more of a pseudo ID from the authority for the first UE, a second ID for the wireless device, a third ID for control of the UE by the wireless device, an allowed location in which control of the first UE by the wireless device is authorized, or an allowed time during which control of the first UE by the wireless device is authorized.

In Aspect 6, the method of any of Aspects 1-5 further includes that the second request is transmitted using at least one of a Uu connection between the first UE and the wireless device, a PC5 connection between the first UE and the wireless device, or a relay between the first UE and the wireless device.

In Aspect 7, the method of any of Aspects 1-6 further includes that the second request further comprising at least one of a second ID for the wireless device or a third ID for control of the UE by the wireless device.

In Aspect 8, the method of any of Aspects 1-7 further includes that the second request comprises a one way hash based on one or more of a pseudo ID from the authority for the first UE, a second ID for the wireless device, an allowed location in which control of the first UE by the wireless device is authorized, or an allowed time during which control of the first UE by the wireless device is authorized.

In Aspect 9, the method of any of Aspects 1-8 further includes controlling the first UE using the connection established between the first UE and the wireless device.

In Aspect 10, the method of any of Aspects 1-9 further includes that the wireless device controls the first UE using a unicast link established with the first UE.

In Aspect 11, the method of any of Aspects 1-10 further includes establishing security for the unicast link based on the information received from the authority.

In Aspect 12, the method of any of Aspects 1-11 further includes that the first UE is associated with a vehicle or a UAV.

In Aspect 13, the method of any of Aspects 1-12 further includes that the wireless device comprises at least one of a second UE, a road side unit, a UAVC, or a TPAE.

In Aspect 14, the method of any of Aspects 1-13 further includes that the authority comprises at least one of an authority for autonomous vehicles, a UAVC, or a TPAE, or a UTM.

Aspect 15 is a system or apparatus including means for implementing a method or realizing an apparatus as in any of Aspects 1-14.

Aspect 16 is a system including one or more processor and memory in electronic communication with the one or more processors to cause the system or apparatus to implement a method as in any of Aspects 1-14.

Aspect 17 is a non-transitory computer readable medium storing instructions executable by one or more processors to cause the one or more processors to implement a method as in any of Aspects 1-14.

Aspect 18 is a method of wireless communication at a UE comprising broadcasting a message comprising a first ID for the UE; receiving a request from a wireless device for a connection with the UE to control the UE, the request comprising information based on the first ID and received from an authority that provided the first ID for the UE; using the information to verify authorization of the wireless device to control the UE; and establishing a connection with the wireless device to control the UE after verifying the authorization of the wireless device to control the UE.

In Aspect 19, the method of Aspect 18 further includes that the first ID comprises an encrypted ID based on a pseudo ID for the UE provided by the authority and at least one of time information and location information for the UE.

In Aspect 20, the method of Aspect 18 or 19 further includes that the information in the request from the wireless device comprises an encrypted and signed ID based on one or more of a pseudo ID from the authority for the UE, a second ID for the wireless device, a third ID for control of the UE by the wireless device, an allowed location in which control of the UE by the wireless device is authorized, or an allowed time during which control of the UE by the wireless device is authorized.

In Aspect 21, the method of any of Aspects 18-20 further includes that the request is received using at least one of a Uu connection between the UE and the wireless device, a PC5 connection between the UE and the wireless device, or a relay between the UE and the wireless device.

In Aspect 22, the method of any of Aspects 18-21 further includes that the request comprises a one way hash based on one or more of a pseudo ID from the authority for the UE, a second ID for the wireless device, an allowed location in which control of the UE by the wireless device is authorized, or an allowed time during which control of the UE by the wireless device is authorized.

In Aspect 23, the method of any of Aspects 18-22 further includes allowing control by the wireless device using the connection established between the UE and the wireless device, wherein the UE receives the control over a unicast link established with the UE.

In Aspect 24, the method of any of Aspects 18-23 further includes establishing security for the unicast link based on the information from the authority comprised in the request.

In Aspect 25, the method of any of Aspects 18-24 further includes that the UE is associated with a vehicle or a UAV.

In Aspect 26, the method of any of Aspects 18-25 further includes that the wireless device comprises at least one of another UE, a road side unit, a UAVC, or a TPAE.

In Aspect 27, the method of any of Aspects 18-26 further includes that the authority comprises at least one of an authority for autonomous vehicles, a UAVC, or a TPAE, or a UTM.

Aspect 28 is a system or apparatus including means for implementing a method or realizing an apparatus as in any of Aspects 18-27.

Aspect 29 is a system including one or more processors and memory in electronic communication with the one or more processors to cause the system or apparatus to implement a method as in any of Aspects 18-27.

Aspect 30 is a non-transitory computer readable medium storing instructions executable by one or more processors to cause the one or more processors to implement a method as in any of Aspects 18-27.

Aspect 31 is a method of wireless communication at an authority for authorizing control of a UE by a wireless device that includes receiving a request from a wireless device requesting authorization to control a UE, the request comprising at least a first ID for the UE, a second ID for the wireless device, or a third ID for control of the UE, verifying the wireless device based on the second ID and the UE based on the first ID, and sending information to the wireless device authorizing the wireless device to control the UE.

In Aspect 32, the method of Aspect 31 further includes that the first ID comprises an encrypted ID based on a pseudo ID from the authority for the UE and at least one of time information and location information.

In Aspect 33, the method of Aspect 31 or 32 further includes that the request from the wireless device further comprises one or more of a location or zone of the message received from the UE, a time, a control area in which the wireless device requests control of the UE, or a control time during which the wireless device requests control of the UE.

In Aspect 34, the method of any of Aspects 31-33 further includes that the information sent to the wireless device authorizing control of the UE comprises an encrypted and signed ID based on one or more of a pseudo ID from the authority for the UE, the second ID for the wireless device, the third ID for control of the UE, an allowed location in which control of the UE by the wireless device is authorized, or an allowed time during which control of the UE by the wireless device is authorized.

In Aspect 35, the method of any of Aspects 31-34 further includes that the first UE is associated with a vehicle or a UAV, wherein the wireless device comprises at least one of another UE, a road side unit, a UAVC, or a TPAE, wherein the authority comprises at least one of an authority for autonomous vehicles, a UAVC, or a TPAE, or a UTM.

Aspect 36 is a system or apparatus including means for implementing a method or realizing an apparatus as in any of Aspects 31-35.

Aspect 37 is a system including one or more processors and memory in electronic communication with the one or more processors to cause the system or apparatus to implement a method as in any of Aspects 31-35.

Aspect 38 is a non-transitory computer readable medium storing instructions executable by one or more processors to cause the one or more processors to implement a method as in any of Aspects 31-35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
  receiving a first sidelink message from a first user equipment (UE) associated with an autonomous vehicle, the message comprising a first identifier (ID), wherein the first ID comprises an encrypted ID based on a pseudo ID from an authority for the first UE, wherein the pseudo ID is different than a long-term ID for the first UE;
  sending, in response to receiving the message from the first UE, a first request to the authority requesting authorization to control the first UE, the first request comprising the first ID, wherein the first request comprises a request for providing instruction for maneuvering the autonomous vehicle;
  receiving, in response to the first request, an authorization ID from the authority that indicates the authorization for the wireless device to control the first UE, wherein the authorization ID from the authority is based on the pseudo ID and wherein the authorization ID is based on a one-way hash that is pre-agreed between the first UE and the authority or provisioned by the authority to the first UE;
  transmitting, to the first UE, a second sidelink message including a second request for connection with the first UE to control the first UE to maneuver the autonomous vehicle, the second request comprising the authorization ID that indicates to the first UE that the wireless device has the authorization received from the authority to control the first UE;
  establishing a unicast link between the wireless device and the first UE based on the authorization of the wireless device to control the first UE; and
  transmitting, via the established unicast link, control instructions to maneuver the autonomous vehicle associated with the first UE.

2. The method of claim 1, wherein the first sidelink message from the first UE comprises a broadcasted message, wherein the first ID comprises the encrypted ID further based on at least one of time information or location information corresponding to the first UE, wherein the first ID changes during movement of the first UE or over time.

3. The method of claim 1, wherein the first request to the authority further includes at least one of a second ID for the wireless device or a third ID for control of the first UE.

4. The method of claim 2, wherein the first request to the authority further comprises one or more of:
  a location or zone of the first sidelink message received from the first UE,
  a time,
  a control area in which the wireless device requests control of the first UE, or
  a control time during which the wireless device requests the control of the first UE.

5. The method of claim 1, wherein the authorization ID comprises an encrypted and signed ID further based on one or more of:
  an allowed location in which control of the first UE by the wireless device is authorized, or
  an allowed time during which the control of the first UE by the wireless device is authorized.

6. The method of claim 1, wherein the second request is transmitted to the first UE using at least one of:
  a Uu connection between the first UE and the wireless device,
  a PC5 connection between the first UE and the wireless device, or
  a relay between the first UE and the wireless device.

7. The method of claim 1, wherein the second request further comprising at least one of a second ID for the wireless device or a third ID for control of the first UE by the wireless device.

8. The method of claim 1, wherein the authorization is generated using a one way hash further based on one or more of:
  an allowed location in which control of the first UE by the wireless device is authorized, or
  an allowed time during which the control of the first UE by the wireless device is authorized.

9. The method of claim 1, wherein the authority comprises at least one of an autonomous vehicles authority, an unmanned aerial vehicle controller (UAVC), or an unmanned aerial vehicle traffic management (UTM).

10. An apparatus for wireless communication at a wireless device, comprising:
  memory; and
  at least one processor coupled to the memory and configured to:
  receive a first sidelink message from a first user equipment (UE) associated with an autonomous vehicle, the first sidelink message comprising a first identifier (ID), wherein the first ID comprises an encrypted ID based on a pseudo ID from an authority for the first UE, wherein the pseudo ID is different than a long-term ID for the first UE;
  send, in response to receiving the message from the first UE, a first request to the authority requesting authorization to control the first UE, the first request comprising the first ID, wherein the first request comprises a request for providing instruction for maneuvering the autonomous vehicle;
  receive, in response to the first request, an authorization ID from the authority that indicates the authorization for the wireless device to control the first UE, wherein the authorization ID from the authority is based on the pseudo ID and wherein the authorization ID is based on a one-way hash that is pre-agreed between the first UE and the authority or provisioned by the authority to the first UE;
  transmit, to the first UE, a second sidelink message including a second request for connection with the first UE to control the first UE to maneuver the autonomous vehicle, the second request comprising the authorization ID that indicates to the first UE that the wireless device has the authorization received from the authority to control the first UE;
  establish a unicast link between the wireless device and the first UE based on the authorization of the wireless device to control the first UE; and
  transmit, via the established unicast link, control instructions to maneuver the autonomous vehicle associated with the first UE.

11. A method of wireless communication at a user equipment (UE), comprising:
  broadcasting a first sidelink message comprising a first identifier (ID) for the UE associated with an autonomous vehicle, wherein the first ID comprises an encrypted ID based on a pseudo ID from an authority for the UE, wherein the pseudo ID is different than a long-term ID for the UE;
  receiving a request, in response to broadcasting the first sidelink message that comprises the first ID for the UE, a second sidelink message comprising an authorization ID that indicates an authorization for a wireless device to control the UE, the authorization ID comprising information based on the pseudo ID, wherein the information is one-way hashed based on a method to generate the authorization ID that is pre-agreed between the UE and the authority or provisioned to the UE from the authority;
verifying that the wireless device is authorized by the authority to control the UE based on the authorization ID received in the second sidelink message;
establishing a connection for a unicast link with the wireless device to allow the wireless device to control the UE after verifying the authorization of the wireless device to control the UE based on the authorization ID; and
receiving, via the unicast link, control instructions to maneuver the autonomous vehicle associated with the UE.

12. The method of claim 11, wherein the first ID comprises the encrypted ID further based on at least one of time information and location information for the UE corresponding to the UE, wherein the first ID changes during movement of the UE or over time.

13. The method of claim 11, wherein the authorization ID in the request from the wireless device comprises an encrypted and signed ID based on one or more of:
an allowed location in which control of the UE by the wireless device is authorized, or
an allowed time during which the control of the UE by the wireless device is authorized.

14. The method of claim 11, wherein the request is received using at least one of:
a Uu connection between the UE and the wireless device,
a PC5 connection between the UE and the wireless device, or
a relay between the UE and the wireless device.

15. The method of claim 11, wherein the authorization ID from the authority is generated using a one way hash further based on one or more of:
an allowed location in which control of the UE by the wireless device is authorized, or
an allowed time during which the control of the UE by the wireless device is authorized.

16. The method of claim 11, further comprising:
allowing control by the wireless device using the connection established between the UE and the wireless device.

17. The method of claim 11, wherein the authority comprises at least one of an autonomous vehicle authority, an unmanned aerial vehicle controller (UAVC), or a third party authorized entity (TPAE), or an unmanned aerial vehicle traffic management (UTM).

18. A method of communication at an authority for authorizing control of a first user equipment (UE) by a wireless device, comprising:
receiving a request from the wireless device requesting authorization to control the first UE to maneuver an autonomous vehicle associated with the first UE, the request comprising a first identifier (ID) for the first UE received from the first UE via sidelink communication and at least a second ID for the wireless device or a third ID for the control of the first UE, wherein the first ID comprises an encrypted ID based on a pseudo ID from the authority for the first UE, wherein the pseudo ID is different than a long-term ID for the first UE;
verifying, in response to receiving the request from the wireless device, the wireless device based on the second ID or the third ID and verifying the first UE based on the first ID, wherein verifying the first UE comprises verifying based on the pseudo ID of the first UE to identify the first UE; and
sending, in response to verifying the wireless device, an authorization ID to the wireless device that indicates the authorization for the wireless device to control the first UE to maneuver the autonomous vehicle wherein the authorization ID is generated based on a one-way hash using a method to generate the authorization ID that is pre-agreed between the first UE and the authority or provisioned by the authority to the first UE.

19. The method of claim 18, wherein the first ID comprises the encrypted ID further based on at least one of time information and location information corresponding to the first UE, wherein the first ID changes during movement of the first UE or over time.

20. The method of claim 18, wherein the request from the wireless device further comprises one or more of:
a location or zone of a message received from the first UE,
a time,
a control area in which the wireless device requests the control of the first UE, or
a control time during which the wireless device requests the control of the first UE.

21. The method of claim 18, wherein the authorization ID comprises an encrypted and signed ID further based on one or more of:
an allowed location in which the control of the first UE by the wireless device is authorized, or
an allowed time during which the control of the first UE by the wireless device is authorized.

22. The method of claim 18, wherein the first UE is associated with a vehicle or an unmanned aerial vehicle (UAV), wherein the wireless device comprises at least one of another UE, a road side unit, an unmanned aerial vehicle controller (UAVC), or a third party authorized entity (TPAE), wherein the authority comprises at least one of an autonomous vehicle authority, the UAVC, or an unmanned aerial vehicle traffic management (UTM).

23. The apparatus of claim 10, wherein the first ID comprises the encrypted ID further based on at least one of time information or location information corresponding to the first UE, wherein the first ID changes during movement of the first UE or over time.

24. The apparatus of claim 23, wherein the first request to the authority further comprises one or more of:
a location or zone of the first sidelink message,
a time,
a control area in which the wireless device requests control of the first UE, or
a control time during which the wireless device requests the control of the first UE.

25. The apparatus of claim 10, wherein the authorization ID comprises an encrypted and signed ID further based on one or more of:
an allowed location in which control of the first UE by the wireless device is authorized, or
an allowed time during which the control of the first UE by the wireless device is authorized.

26. The apparatus of claim 10, wherein the authorization ID is generated using a one way hash further based on one or more of:
an allowed location in which control of the first UE by the wireless device is authorized, or
an allowed time during which the control of the first UE by the wireless device is authorized.

27. An apparatus for wireless communication at a user equipment (UE), comprising:
a memory; and
at least one processor coupled to the memory and configured to:
broadcast a first sidelink message comprising a first identifier (ID) for the UE associated with an autonomous vehicle, wherein the first ID comprises an encrypted ID based on a pseudo ID from an authority for the UE, wherein the pseudo ID is different than a long-term ID for the UE;
receive a request, in response to the first sidelink message that comprises the first ID for the UE, a second sidelink message comprising an authorization ID that indicates an authorization for a wireless device to control the UE, the authorization ID comprising information based on the pseudo ID, wherein the information is one-way hashed based on a method to generate the authorization ID that is pre-agreed between the UE and the authority or provisioned to the UE from the authority;
verify that the wireless device is authorized by the authority to control the UE based on the authorization ID received in the second sidelink message;
establish a connection for a unicast link with the wireless device to allow the wireless device to control the UE after a verification of the authorization of the wireless device to control the UE based on the authorization ID; and
receive, via the unicast link, control instructions to maneuver the autonomous vehicle associated with the UE.

28. The apparatus of claim 27, wherein the first ID comprises the encrypted ID further based on at least one of time information and location information for the UE corresponding to the UE, wherein the first ID changes during movement of the UE or over time.

29. The apparatus of claim 27, wherein the authorization ID in the request from the wireless device comprises an encrypted and signed ID based on one or more of:
an allowed location in which control of the UE by the wireless device is authorized, or
an allowed time during which the control of the UE by the wireless device is authorized.

30. The apparatus of claim 27, wherein the authorization ID is generated using a one way hash further based on one or more of:
an allowed location in which control of the UE by the wireless device is authorized, or
an allowed time during which the control of the UE by the wireless device is authorized.

* * * * *